(12) United States Patent
Kellens et al.

(10) Patent No.: US 8,697,393 B2
(45) Date of Patent: Apr. 15, 2014

(54) ENZYME INTERESTERIFICATION PROCESS

(75) Inventors: Marc Kellens, Mechelen-Muizen (BE); Veronique Gibon, Vedrin (BE); Vaida Petrauskaité, Halle (BE); Jeroen Maes, Moerbeke-Waas (BE)

(73) Assignee: N.V. Desmet Ballestra Engineering S.A., Zaventem (BE)

( * ) Notice: Subject to any disclaimer, the term of this patent is extended or adjusted under 35 U.S.C. 154(b) by 0 days.

(21) Appl. No.: 13/447,953

(22) Filed: Apr. 16, 2012

(65) Prior Publication Data
US 2012/0270283 A1 Oct. 25, 2012

(30) Foreign Application Priority Data

Apr. 21, 2011 (GB) .................. 1106810.3

(51) Int. Cl.
*C12P 33/00* (2006.01)
(52) U.S. Cl.
USPC ........................................... 435/52
(58) Field of Classification Search
USPC ........................................... 435/52
See application file for complete search history.

(56) References Cited

U.S. PATENT DOCUMENTS

| 4,377,686 A | 3/1983 | Feuge et al. |
| 4,416,991 A | 11/1983 | Matsuo et al. |
| 4,798,793 A | 1/1989 | Eigtved |
| 4,861,716 A | 8/1989 | Macrae et al. |
| 5,166,064 A | 11/1992 | Usui et al. |
| 5,219,733 A | 6/1993 | Myojo et al. |
| 5,292,649 A | 3/1994 | Kosugi et al. |
| 5,773,266 A | 6/1998 | Bosley et al. |
| 2005/0014237 A1 | 1/2005 | Lee |
| 2008/0057552 A1 | 3/2008 | Lee et al. |

FOREIGN PATENT DOCUMENTS

| EP | 1 990 398 A1 | 11/2008 |
| EP | 2 204 097 A1 | 7/2010 |
| EP | 2 298 727 A1 | 3/2011 |
| JP | 61296096 A | 12/1986 |
| JP | 62272982 A1 | 11/1987 |
| WO | WO 2006/050589 A1 | 5/2006 |
| WO | WO 2008/069804 A1 | 6/2008 |

OTHER PUBLICATIONS

Isono et al., Biosci. Biotech. Biochem., 59(9), 1632-1635, 1995.*
Search Report Under Section 17(5) issued by the Intellectual Property Office in Britain mailed Jul. 18, 2011 for Application No. GB11068100.3 filed Apr. 21, 2011.
Examination Report Under Section 18(3) issued by the Intellectual Property Office in Great Britain mailed Jul. 31, 2013 for Application No. GB1106810.3 filed Apr. 21, 2011.

\* cited by examiner

*Primary Examiner* — Maryam Monshipouri
(74) *Attorney, Agent, or Firm* — Wegman, Hessler & Vanderburg

(57) ABSTRACT

A fatty material enzyme interesterification process comprising the steps of: a) providing a fatty material that has optionally undergone at least one prior purification treatment; b) introducing soap into said fatty material to form a soap-containing fatty material mixture, c) homogenising said soap-containing fatty material mixture by mixing, d) contacting said soap-containing fatty material mixture with lipase to produce a soap-containing interesterified fatty material, e) removing soaps from said soap-containing interesterified fatty material to yield interesterified fatty material, wherein said soap is either formed in-situ by addition of aqueous alkali to said fatty material or said soap is introduced directly into said fatty material.

17 Claims, 2 Drawing Sheets

ENZYME INTERESTERIFICATION PROCESS

PRIORITY

Priority benefit of Great Britain patent application GB 1106810.3, filed Apr. 21, 2011 under 35 USC §119 is hereby claimed.

FIELD OF THE INVENTION

The invention relates to a process comprising a combined and collaborative pre- and post-treatment of fatty materials modified by enzyme catalyzed interesterification.

BACKGROUND OF THE INVENTION

Interesterification can be either chemically or enzyme catalysed. If the interesterification is chemically catalysed, the fatty acids groups are rearranged randomly along the 3 positions of the glycerol backbone according to the law of probability. If the interesterification is enzyme catalysed, selectivity in the rearrangement of the fatty acids groups along the 3 positions of the glycerol backbone can be achieved.

Enzyme-catalysed interesterification is preferred over chemically-catalysed interesterification to reduce the amount of waste effluent and to reduce the use of chemicals.

However, the drawback of the enzyme catalysed interesterification is the relatively low activity and low stability of the enzymes used as catalyst. Indeed, enzymes show optimal activity when a precise set of conditions are met. In particular it is important to operate within a relatively narrow range of temperature, moisture content and in absence of impurities such as for example peroxides, aldehydes or ketones (resulting from the oxidation of oils and fats), phospholipids or soaps. When one or more of these conditions are not met, a denaturation or inactivation of the enzyme can take place, inducing a modification of its structure and hence a decrease or total loss of its activity. This denaturation is the mechanism behind the progressive loss of activity of the enzyme catalyst during the interesterification of fatty materials. A progressive loss of activity of the enzyme is observed even if highly refined fatty material is the feedstock of enzyme-catalysed interesterification. In fact, very minute amounts of impurities in the fatty material to be interesterified may lead to the progressive denaturation and loss of activity of the enzyme selected as catalyst. Therefore several methods have been proposed to purify and treat further fatty material used as feedstock of enzyme-catalysed interesterification, even if these fatty materials have already been previously purified by conventional processes in the oils and fats industry.

Examples of methods for purifying and further treating fatty material used as feedstock of enzyme-catalysed interesterification are disclosed U.S. Pat. No. 4,416,991A, in U.S. Pat. No. 4,861,716A, US 2005/0014237A1, US 2008/0057552A1 and WO 2008/069804A1.

U.S. Pat. No. 4,416,991A discloses a method for the enzymatic transesterification of a lipid which comprises continuously or repeatedly contacting an enzyme or an enzyme preparation having transesterification activities with a fresh supply of a dried fatty ester substrate while maintaining the total amount of water in the reaction system at or below the solubility limit of water in the fatty acid ester used.

U.S. Pat. No. 4,861,716A discloses a continuous interesterification process comprising the steps of: (a) precipitating a 1,3-specific lipase on inert particulate support material; (b) activating the lipase by addition of water in an amount effective to activate the lipase; (c) packing the inert support material carrying the precipitated lipase in a fixed bed; (d) preparing a fatty reactant mixture selected from the group consisting of fatty acids containing 3 to 20 carbon atoms, their esters including triglyceride oils and fats, their fractionated and hydrogenated derivatives, and combinations thereof; (e) dissolving water in said mixture in an amount sufficient to favor interesterification and minimize hydrolysis; (f) continuously flowing said mixture of step (e) through the fixed bed whereby a total contact time of less than two hours is achieved and glycerides in the 1,3-positions are formed; and (g) recovering from the solution of step (f), the glycerides enriched in the 1,3-positions.

JP 02-203789A discloses that when oils and fats consisting of vegetable oil and/or animal oil are brought into contact with an immobilized enzyme obtained by absorbing and retaining a lipase onto a carrier and subjected to ester interchange reaction to modify oil and fats, an alkaline substance is added to the reaction system. The pH of the reaction liquid is preferably adjusted to by adding the alkaline substance to the reaction system. The carrier in which the lipase is absorbed and retained preferably includes a weakly acidic cation exchange resin. US 2008/0027552A1 reports that JP 02-203789A describes extending the half life of immobilized lipase by pre-treatment of the substrate with an alkaline substance. When an equal mixture of rapeseed oil and palm olein was interesterified on a column of lipase immobilized on Celite 535, the half life of the lipase was 18 hours. When the substrate was mixed with a solution of 1.8M potassium hydroxide (5 mL/kg substrate) the half life of the enzyme activity was 96 h.

JP 02-203790A discloses that when oils and fats consisting of vegetable oil and/or animal oil are brought into contact with an immobilized enzyme obtained by absorbing and retaining a lipase in a carrier and subjected to ester interchange reaction to modify oil and fats, a porous material is added to the reaction system. As the porous material, a material by which pH is turned to when the porous material is brought into contact with water is preferably used. The porous material includes e.g. a material obtained by treating molecular sieve, active carbon, diatomaceous earth or ion exchange resin with an alkaline aqueous solution. US 2008/0057552A1 reports that JP 02-203790A describes treating celite with sodium hydroxide and mixing this into the same substrate mixture. Using this approach, lipase half life was extended to 33 hours.

US 2005/0014237A1 discloses a method of making an esterified, transesterified or interesterified product comprising: (a) forming an initial substrate comprising one or more fats or oils; (b) deodorizing said initial substrate thereby reducing the constituents which cause or arise from fat or oil degradation in said initial substrate and thereby producing a deodorized substrate; (c) contacting said deodorized substrate with an enzyme thereby making said esterified, transesterified or interesterified product; wherein the half-life of said enzyme is prolonged.

US 2008/0057552A1 discloses a process for producing fats or oils comprising: placing a glyceride in contact with a compound selected from the group consisting of granular clay, granular carbon, and a combination thereof, thus forming a purified substrate; and placing the purified substrate in contact with a lipase, thus producing the fat or the oil.

WO 2008/069804A1 discloses a method for continuous enzymatic treatment of a lipid-containing composition at a substantially constant flow rate, the method comprising the steps of (a) providing a lipid-containing feedstock, (b) contacting said feedstock with a first processing aid to pre-treat the feedstock, (c) causing said feedstock to pass at a substantially constant flow rate through a treatment system comprising a plurality of enzyme-containing fixed bed reactors connected to one another in series, and (d) said fixed bed reactors being individually serviceable, the flow rate of the feedstock remaining substantially constant through the treatment system when one of said fixed bed reactors is taken off-line for servicing with preferred processing aids including chromatographic silica, fused silica, precipitated silica, fumed silica, colloidal silica, amorphous silica, silica hydrogel, and sodium aluminium silicate.

While the prior art methods described here above are indeed directed to increase the activity and/or the life-time of the enzyme by either removing impurities contained in the fatty material and/or either adjusting favourably the fatty material moisture content or acidity, those methods include various drawbacks. Use of packed column(s) loaded with, for example, chromatographic grade silica or clays will induce a pressure increase caused by the progressive fouling of the adsorbent material. Additionally, such adsorbents may release unknown contaminants that may be complicated to remove and even affect enzyme activity negatively. Addition of a relatively large amount of aqueous potassium hydroxide (5 mL/kg substrate) to the fatty material will induce extensive hydrolysis leading to unacceptable amount of free fatty acids and partial glycerides. Instant deodorisation performed just before the interesterification process will require high capital investment before being put into practice and hence will result in higher processing costs.

An often underestimated issue is that the enzyme carrier can release minor components that may have negative effect on oil quality requiring thus additional post-purification. For example release of off-flavours has been observed in several instances.

Accordingly, there remains a need in the art to overcome the limitation of the existing pre-treatment processes of fatty materials intended for the enzymatic catalysed interesterification.

SUMMARY OF THE INVENTION

It is an object of the present invention to provide a pre- and post-treatment process for the fatty material used in enzyme catalysed interesterification in order to increase the enzyme activity and half-life thereby inducing a higher productivity.

It is an advantage of the present invention to provide a pre- and post-treatment process for the fatty materials used in enzyme catalysed interesterification not limited by pressure increase issues.

It is a further advantage of the present invention to provide a pre- and post-treatment process for the fatty materials used in enzyme catalysed interesterification that does not necessitate the utilisation of expensive equipment and/or chemicals.

It is a further advantage of the present invention to provide a pre- and post-treatment process for the fatty materials used in enzyme catalysed interesterification that does not generate extensive hydrolysis of the fatty materials leading to unacceptable amount of free fatty acids and partial glycerides and that does not necessitate corrosive treatment of objects in contact with food grade fatty materials.

It is a still further advantage of the present invention to provide a pre- and post-treatment process for the fatty materials used in enzyme catalysed interesterification not restricted by problematic disposal of wasted materials.

It has been surprisingly found that the activity and half-live of the enzyme can be increased by the addition of controlled amount of soap to the fatty material feed. The above objective is realised by a process according to the present invention in which a soap is introduced into a fatty acid material which may have already undergone one or more purification treatments, the soap is homogenised in the fatty acid material and an enzyme is added to the resulting mixture of soap and fatty acid material forming an interesterified fatty material.

A clear and unexpected improvement of the enzyme performance was observed when the fatty material being interesterified contained 50 ppm of soaps created in situ by the addition of 80 ppm of sodium hydroxide solution (2.5M), an improvement of about 50%, whereas addition of 5,000 ppm of a solution of 1.8M potassium hydroxide to the fatty material was required in the process disclosed in JP 02-203789A being an amount nearly two orders of magnitude greater than the one reported in our examples. Such substantial performance improvement of the enzyme was not observed if the soaps were removed before the interesterification step. It has been further observed that the presence of 50 ppm of sodium soaps in the fatty material did not induce a pressure build-up across the packed bed reactors even after 18 days of continuous operation.

According to a first aspect of the present invention, a process is provided comprising the steps of:
a) providing a fatty material that has optionally undergone at least one prior purification treatment;
b) introducing soap into said fatty material Ito form a soap-containing fatty material mixture,
c) homogenising said soap-containing fatty material mixture by mixing,
d) contacting said soap-containing fatty material mixture with enzyme (e.g. lipase) to form a soap-containing interesterified fatty material,
e) removing soaps from said soap-containing interesterified fatty material to yield interesterified fatty material,
wherein said soap is either formed in-situ by addition of aqueous alkali to said fatty material or said soap is introduced directly into said fatty material.

According to a second aspect of the present invention, the use of a soap to improve the productivity of a fatty material enzyme interesterification process is provided, said process using soap comprising the steps of:
a) providing a fatty material that has optionally undergone at least one prior purification treatment;
b) introducing soap into said fatty material to form a soap-containing fatty material mixture,
c) homogenising said soap-containing fatty material mixture by mixing,
d) contacting said soap-containing fatty material mixture with lipase to produce a soap-containing interesterified fatty material,
e) removing soaps from said soap-containing interesterified fatty material to yield interesterified fatty material,
wherein said soap is either formed in-situ by addition of aqueous alkali to said fatty material or said soap is introduced directly into said fatty material.

Particular and preferred aspects of the invention are set out in the accompanying independent and dependent claims. Features from the dependent claims may be combined with features of the independent claims and with features of other dependent claims as appropriate and not merely as explicitly set out in the claims.

The above and other characteristics, features and advantages of the present invention will become apparent from the following detailed description, taken in conjunction with the accompanying drawings, which illustrate, by way of example, the principles of the invention. This description is

Figure 1:
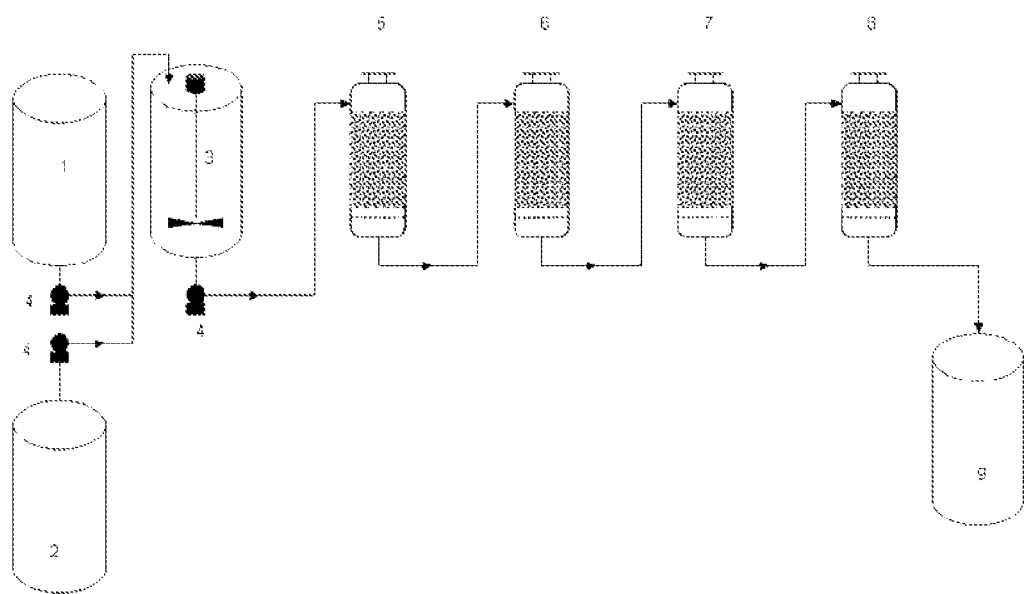
FIG. 1 is a simplified sketch of a standard enzyme interesterification of fatty material process.

In the different figures, the same reference signs refer to the same or analogous elements.

DETAILED DESCRIPTION

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

The following terms are provided solely to aid in the understanding of the invention.

DEFINITIONS

The term "interesterification", as used in disclosing the present invention, is a process modifying the physical properties of fatty materials by rearranging the fatty acids groups within and between the different triglycerides. In particular, a fatty material characterized by a desired melting behaviour can be obtained by interesterification of two or more adequately chosen starting fatty materials.

The term, "fatty material", as used in disclosing the present invention, means oils or fats from vegetal or animal origin optionally partially or fully hydrogenated or fractionated or interesterified and any blend thereof.

The term "purification treatment", as used in disclosing the present invention, means a conventional purification treatment belonging to the oils and fats industry such as for example degumming, neutralization, bleaching, winterization, deodorisation or any sequence thereof.

The term "soap", as used in disclosing the present invention, means the alkali salt of any fatty acid such as for example sodium stearate or potassium palmitate or any blend thereof.

"FFA" is an abbreviation for "free fatty acids", which include, for example, palmitic acid and stearic acid. FFA are naturally present in most fatty material or originate from the hydrolysis of triglycerides present in fatty material.

The term "alkali", as used in disclosing the present invention, means a substance dissolving in water to form a solution of a pH greater than 7 such as for example NaOH, KOH, LiOH, $Ca(OH)_2$, $Na_2CO_3$, $NaHCO_3$, $Na_2SO_4$, $Na_3PO_4$, $CaCO_3$, $(Ca(HCO_3)_2)$ or any mixture thereof.

The term "enzyme", as used in disclosing the present invention, means a protein or protein blend acting as catalyst in the interesterification of fatty material such as for example a lipase.

The term lipase, as used in disclosing the present invention, means a water-soluble enzyme (triacylglycerol acylhydrolases, EC 3.1.1.3) that catalyzes the hydrolysis of ester chemical bonds in water-insoluble lipid substrates and represent a subclass of the esterases, for instance *Thermomyces lanugi-*

*nosus* which has been commercialized by immobilization on silica granulates under the name of Lipozyme TLIM supplied by Novozymes. Such enzymes are commercially available from a broad range of manufacturers and organisms, and are useful in catalyzing reactions with commodity oils and fats. See, e.g., Xu, X., "Modification of oils and fats by lipase-catalyzed interesterification: Aspects of process engineering," in Enzymes in Lipid Modification, 190-215 (Bornscheuer, U. T., ed., Wiley-VCH Verlag GmbH, Weinheim, Germany, 2000).

The term "enzyme activity", as used in disclosing the present invention, means the efficiency of an enzyme to catalyze a reaction at a given time. The enzyme activity decreases with time due to denaturation.

p-NMR is an abbreviation of pulsed $^1$H NMR.

Initial reaction rate (k–0 (1/min)) is a measure of the initial activity of an enzyme.

Average Enzyme Production rate (abbreviated to Avg Prod) in kg oil/kg enzyme/hr is the amount of oil (or fatty material) interesterified for a given amount of enzyme during one hour.

Enzyme half-life (min) is the time needed to observe that the enzyme activity is divided by a factor two during an interesterification.

Enzyme volume-based half-life (V½ (kg oil/kg enzyme)) is the amount of oil that decreases the activity of the enzyme to 50% of the starting level.

Enzyme productivity (kg oil/kg enzyme) is the amount of fatty material that one kg of enzyme can interesterified before being discarded for lack of activity. By convention enzyme productivity equals three times the enzyme volume-based half-life.

Process

As illustrated in the review of the prior art documents available in the area of the enzyme interesterification of fatty materials, it is preferred to start with a purified fatty material feedstock to increase the half-life of the enzyme. This is exemplified in Table 1 which lists the specifications that the fatty material intended to be interesterified have to meet in order to ensure optimal and prolonged enzyme activity. Table 1 is specifically valid for the Lipozyme TLIM, (Novozymes, Bagsvaerd, Denmark), which is widely used on industrial scale as catalyst for the enzymatic interesterification of oils and fats.

TABLE 1

Example of specifications of fatty material intended for enzyme interesterification established for Lipozyme TLIM from Novozymes.

| Chemical Specifications | |
| --- | --- |
| FFA | 0.1% max |
| Moisture and impurities | 0.1% max |
| Moisture content | 0.02% min |
| Soap content | 1 ppm max |
| Fe content | 0.1 ppm max |
| Ni content | 0.2 ppm max |
| Cu content | 0.01 ppm max |
| P content | 3 ppm max |
| AnV | 5 max |
| PV | 1 meq O$_2$/kg max |
| Physical Specifications | |
| Oil temperature | 70° C. |

As mentioned in Table 1, the parameters quantifying the purity of fatty material feed are very stringent, in particular the soap content specification below 1 ppm. Only fatty materials that have been carefully degummed, neutralised, refined, bleached and deodorised can meet these specifications.

It has been surprisingly found that the activity and half-live of the enzyme can be increased by the addition of controlled amount of soap or aqueous alkali in the fatty material feed. In the later case the aqueous alkali reacts rapidly with FFA contained in fatty material to form the desired amount of soap. Improved enzyme productivity were recorded when about 1 to 1000 ppm of soap was highly dispersed in fatty material. This result is surprising in regard of the current recommendations as exemplified by Table 1.

FIG. 1 is a simplified sketch of a standard enzyme interesterification process of fatty material in which a fatty material feed (1) and fatty material feed (2) are blended and homogenised in an intermediate storage tank (3) and forced to percolate, via feeding pump (4), through several reactors loaded with immobilized enzyme (5 to 8). The enzyme interesterified fatty material is finally stored in tank (9) and is optionally subjected to additional purification steps (not shown).

Figure 2:
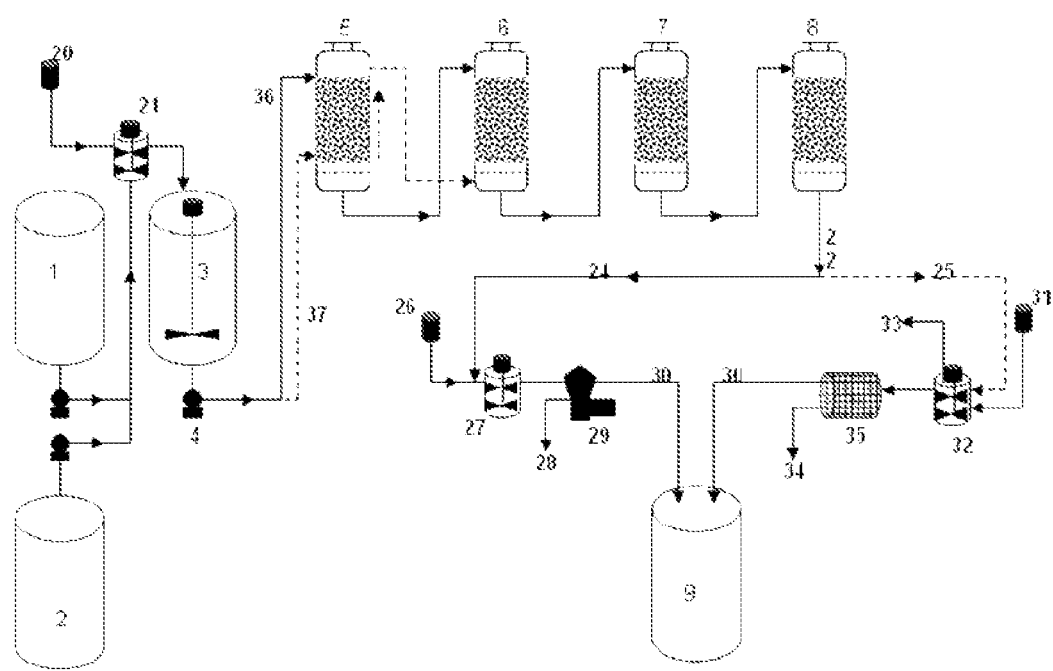
FIG. 2 is a simplified sketch of enzyme interesterification of fatty material according to a preferred embodiment of the present invention.

FIG. 2 is a simplified sketch of an enzyme-catalysed interesterification of fatty acids, according to an embodiment of the present invention, in which adequate amounts of aqueous alkali or soap stored in tank (20) are mixed to the desired blend of fatty material feed (1) and fatty material feed (2) using a mixing device (21), such as a dynamic mixer, to form a soap-containing fatty material which can further be stored and stirred in an intermediate storage tank (3). The soap-containing fatty material is forced to percolate, via feeding pump (4), through several reactors loaded with immobilized enzyme (5 to 8) to yield enzyme-interesterified soap-containing fatty material (22). At this stage the interesterified soap-containing fatty material is post-treated either by a wet (24) or a dry treatment (25). The wet post-treatment uses an aqueous acid from tank (26) mixed with enzyme interesterified soap-containing fatty material in mixer (27) in order to wash and neutralise the soap and any other alkali. The aqueous phase (28) is removed in a centrifugal separator (29) yielding the final enzyme-interesterified fatty material (30) stored in tank (9). The dry post-treatment uses an adsorbent from tank (31) mixed with enzyme-interesterified soap-containing fatty material in mixer (32) in order to adsorb and/or neutralise the soap and any other alkali. The mixer is optionally connected to a vacuum (33) to dry further the fatty material. The spent adsorbent (34) is removed by filter (35) to yield the final enzyme-interesterified fatty material (30) stored in tank (9).

FIG. 2 represents a process involving two fatty material feeds, but the present invention may involve one or more fatty material feed(s). Although FIG. 2 shows a process involving four packed-bed reactors supplied from top to bottom, the present invention is not limited to this particular configuration. Reversing the soap-containing fatty material flow from top to bottom (36) to bottom to top (37) for one or more of the packed bed reactors may solve pressure build-up or channelling issues and therefore improve the productivity of the process.

According to a preferred embodiment of the process, according to the present invention, at least a part of fatty material feed is a crude triglyceride oil or fat that has already been subjected to one or more prior refining processes such as degumming, physical refining, neutralisation, bleaching, winterising or deodorisation. Preferably the fatty material feed has been degummed, refined, bleached and deodorized.

According to a further preferred embodiment of the process, according to the present invention, at least a part of said fatty material feeds is optionally subjected to a prior fractionation process either solvent fractionation or dry fractionation.

According to another preferred embodiment of the process, according to the present invention, at least a part of said fatty material feeds is optionally subjected to modification such as full or partial hydrogenation, or even interesterification either chemically- or enzymatically-catalysed.

According to another preferred embodiment of the process, according to the present invention the fatty material feed is pre-treated by the addition soap or aqueous alkali with the aqueous alkali preferably having a concentration of 1M to 10M, with a concentration of 1.5M to 7M being preferred and a concentration of 2M to 6M being particularly preferred. If aqueous alkali is added to the fatty material, soap is formed in-situ, to yield a soap-containing fatty material mixture. Alternatively soap can be introduced directly into said fatty material. According to a preferred embodiment of the present invention, the amount of soap added to the fatty material is in the range of 1 to 1000 ppm by weight of said fatty material, with a range of 3 to 500 ppm by weight of said fatty acid being preferred, with a range of 5 to 200 ppm by weight of said fatty material being particularly preferred and a range of 20 to 100 ppm by weight of said fatty material being especially preferred. The soap can be blended directly with said fatty material or formed in-situ by blending aqueous alkali with said fatty material. In the later case the aqueous alkali reacts readily with FFA, which is always present in the fatty material. Even if the fatty material were to contain no FFA, or a smaller amount than the stoichiometric amount of alkali, a rapid hydrolysis of some triglycerides would take place and yield soaps. This is a well known consequence of the addition of aqueous alkali, in particular aqueous hydroxide, to fatty material. The amount of aqueous alkali added to the fatty material is in direct proportion of the desired amount of soap. It has been observed that the preferred amount of aqueous alkali, such as a 2.5 M aqueous sodium hydroxide, is in the range of 1 to 1,000 ppm by weight of said fatty material, with a range of 5 to 500 ppm by weight of said fatty material being preferred, a range of 20 to 300 ppm by weight of said fatty material being particularly preferred, a range of 30 to 150 ppm by weight of said fatty material being especially preferred. The present invention is not limited to the addition of a sodium soap or to the addition of aqueous sodium hydroxide to the fatty material. Potassium, calcium or magnesium soaps may be blended with the fatty material, according to the present invention. Accordingly potassium or calcium hydroxide may be blended to the fatty material to form the corresponding soap in-situ. Weaker alkali may be used such as sulphate, phosphate, carbonate or citrate of metals selected from the group consisting of sodium, potassium, calcium and magnesium.

Adding aqueous alkali to the fatty material feed also permits to readjust its moisture content. Indeed as reflected in Table 1, the moisture content of fatty material intended for interesterification ranges between 0.02% and 0.1% (200 to 1000 ppm of water). Considering that typically fatty material that has been refined, bleached and deodorised will have a moisture content of 0.02%, the addition of for example 100 ppm of aqueous solution of sodium hydroxide 2.5M will generate about 60 ppm of soap but also adjust the moisture content of the fatty material to about 300 ppm. Based on the targeted concentrations of soap and moisture desired in the fatty material feed it is straightforward to calculate the adequate molarity of the aqueous alkali that will be added to said fatty material.

There are many microorganisms from which lipases useful in the present invention may be obtained. U.S. Pat. No. 5,219,733 lists examples of such microorganisms including those of the genus *Achromobacter* such as *A. iofurgus* and *A. lipolyticum*; the genus *Chromobacterium* such as *C. viscosum* var. *paralipolyticum*; the genus *Corynebacterium* such as *C. acnes*; the genus *Staphylococcus* such as *S. aureus*; the genus *Aspergillus* such as *A. niger* and *A. oryzae*; the genus *Candida* such as *C. cylindracea, C. antarctica* b, *C. rosa* and *C. rugosa*; the genus *Humicola* such as *H. lanuginosa* and *H. rosa*; the genus *Penicillium* such as *P. caseicolum, P. crustosum, P. cyclopium* and *P. roqueforti*; the genus *Torulopsis* such as *T. ernobii*; the genus *Mucor* such as *M. miehei, M. japonicus* and *M. javanicus*; the genus *Bacillus* such as *B. subtilis*; the genus *Thermomyces* such as *T. ibadanensis* and *T. lanuginosa* (see Zhang, H. et al. JAOCS 78: 57-64 (2001)); the genus *Rhizopus* such as *R. delemar, R. japonicus, R. arrhizus* and *R. neveus*; the genus *Pseudomonas* such as *P. aeruginosa, P. fragi, P. cepacia, P. mephitica* var. *lipolytica* and *P. fluorescens*; the genus *Alcaligenes*; the genus *Rhizomucor* such as *R. miehei*; and the genus *Geotrichum* such as *G. candidum*. Several lipases obtained from these organisms are commercially available as purified enzymes. The skilled artisan would recognize other enzymes capable of affecting esterification, transesterification or interesterification including other lipases useful for the present invention.

Lipases obtained from the organisms described herein may be immobilized for the present invention on suitable carriers by a method known to persons of ordinary skill in the art. U.S. Pat. No. 4,798,793; U.S. Pat. No. 5,166,064; U.S. Pat. No. 5,219,733; U.S. Pat. No. 5,292,649; and U.S. Pat. No. 5,773,266 describe examples of immobilized lipase and methods of preparation. Examples of methods of preparation include the entrapping method, inorganic carrier covalent bond method, organic carrier covalent bond method, and the adsorption method.

According to a preferred embodiment of the process, according to the present invention, the enzyme is retained and immobilized on a carrier e.g. a silica granulate or a porous material e.g., a mesoporous, a microporous or a macroporous material. Examples of suitable porous materials are molecular sieve, diatomaceous earth and ion exchange resin e.g. celite.

According to another preferred embodiment of the process, according to the present invention the soap is added to the fatty material feed concurrently with sufficient water to adjust the moisture content of the fatty material feed according to the specifications of the enzyme manufacturer. This embodiment is preferred if the moisture content of the fatty material feed is below the specification of the enzyme manufacturer. Adding water concurrently to the soap ensure a proper mixing of both substances in the fatty material. An aqueous solution of soap may also be suitable for the purpose of adjusting the moisture content of the fatty material feed.

According to another preferred embodiment of the process, according to the present invention the soap is selected from the group consisting of sodium stearate, potassium stearate, calcium stearate, magnesium stearate, sodium palmitate, potassium palmitate, calcium palmitate, magnesium palmitate, sodium oleate, potassium oleate, calcium oleate, magnesium oleate, sodium laurate, potassium laurate, calcium laurate, magnesium laurate and mixtures thereof.

According to another preferred embodiment of the process, according to the present invention, the aqueous alkali is selected from the group consisting of sodium hydroxide, potassium hydroxide, calcium hydroxide, sodium sulphate, potassium sulphate, calcium sulphate, sodium phosphate, potassium phosphate, calcium phosphate, sodium citrate, potassium citrate, calcium citrate and mixtures thereof.

According to another preferred embodiment of the process, according to the present invention, the aqueous alkali, or the soap is added to said fatty material by a metering means such as a dosing pump. Such means are well known in the art but special attention should be given so as to secure an exact and constant dosing to promote a steady interesterification of the soap-containing fatty material. Subsequent to the addition of the aqueous alkali, or the soap, it is essential to mix the aqueous alkali, or the soap, to the fatty material. It has been found that a dynamic mixer ensures a sufficient mixing, but the invention is not limited to this specific mixing equipment.

According to another preferred embodiment of the process, according to the present invention, the mixed soap-containing fatty material is stored in an intermediate storage tank. Typically, such intermediate storage tank is moderately agitated to keep the material homogeneous and to avoid any material settling. Several known technical solutions are possible to realise proper intermediate agitated storage. In the process according to the present invention such intermediate storage is optional since the soap-containing fatty material is already thoroughly mixed and homogenised in a dynamic mixer. However such intermediate storage has often found to be convenient as a buffer tank to cope with output variation of the process.

According to another preferred embodiment of the process, according to the present invention, the soap-containing fatty material is contacted with enzyme to form a soap-containing interesterified fatty material. This step is typically realized in serially arranged packed bed reactors. In such reactors the enzyme is immobilized on an inert carrier material. The fatty material is pumped and forced to percolate from top to bottom, or optionally from bottom to top, through several reactors. It is also well-known in the art to design the piping to easily isolate one of the reactors for cleaning or maintenance or reloading with fresh immobilized enzyme for example, while the other reactors are kept operating. The enzyme is for example a lipase *Thermomyces lanuginosus* immobilized on silica granulates commercialized by Novozymes under the name of Lipozyme TLIM. It has been observed that the performance of the enzyme is significantly improved with the process according to the present invention.

It has been further observed that the presence of 50 ppm of sodium soaps in the fatty material did not induce a pressure built-up across the packed bed reactors even after 18 days of continuous operation. Nevertheless the possibility of pressure built-up across the packed bed reactors must be taken account if high concentration of soaps and/or the utilisation of soaps of calcium or magnesium are considered. The present invention is not limited to packed bed reactors. Therefore any continuous or batch reactors designed for the enzyme interesterification of fatty material may be used and solve any pressure build issue that could be observed with packed bed reactors.

According to another preferred embodiment of the process, according to the present invention, the process is usually operated at a temperature ranging from 30 to 90° C. preferably from 60 to 80° C., but the process according to the present invention is not limited to such specific temperature ranges.

According to another preferred embodiment of the process, according to the present invention, the removal of the soap is operated after the enzymatic interesterification either by a wet or a dry post-treatment. The wet post-treatment includes for example a washing with a weak aqueous solution of citric or phosphoric acid followed by a phase separation. Typically a dynamic mixer is used for the washing and a centrifuge separator is used to separate the aqueous phase from the final interesterified material. The weak aqueous solution can be replaced by aqueous colloidal silica such as for example Ludox from W. R. Grace.

The dry post-treatment includes other means for the removal of the soap from the interesterified soap-containing fatty material such as for example adsorption on suitable adsorbent material followed by a phase separation, typically a filtration. Such adsorbent materials may have a variety of particle sizes, shapes, distributions, porosity, solid content, surface coating, counter-ions, etc. Silica (Trisyl® from W. R. Grace) has been found very efficient to remove the soap but the invention is not limited to this particular silica material. Other adsorbent materials such as filtracell (based on cellulose fibres) or bleaching earth (based on montmorillonite and the like material) have been found efficient. The dry post-treatment process will typically mix the adsorbent material to the soap-containing interesterified fatty material in a dynamic mixer connected to vacuum. During the mixing soap and/or other substances are adsorbed on the adsorbent material. The spent adsorbent material is then removed by filtration to yield the final enzyme interesterified fatty material. The post treatments can be performed at a lower temperature than the one selected for the preceding embodiments. In fact, any material or method used in the oils and fats industry for the removal of soap from a fatty material could potentially be suitable as post treatment of the process according to the present invention.

According to another preferred embodiment of the process, according to the present invention, at least one of the packed bed reactors optionally contains adsorbent material for removing the soap. Silica (Trisyl® from W. R. Grace) has been found very efficient in removing the soap but the invention is not limited to this particular silica material. Preferably said packed bed reactor(s) containing silica material is (are) the last one(s) of the serially disposed reactors. According to this embodiment the removal of the soap is performed during the last stage(s) of the interesterification. This embodiment is also preferred to remove contaminants that may be released by the enzyme or by its carrier.

EXAMPLES

Example 1

Enzyme Performance Evaluation for Multiple Batch Reactions (MBA)

The objective of the MBA tests was to determine the performance of TLIM for the interesterification of fatty material. It was a rapid batch laboratory test consuming limited amounts of supplies. The starting fatty materials are blends of RBD palm oil (physically Refined, Bleached and Deodorized) and referred to as "oil" in Examples 1 and 2.

In an MBA test, an oil blend was interesterified in several batch reactions using TLIM (*Thermomyces lanuginosus* lipase from Novozymes) as catalyst. At the end of each of the batch reactions, the interesterified oil was decanted from the catalyst which remained in the reactor. Fresh oil was added to the catalyst and another batch reaction was carried out. Based on the average reaction rate of the enzyme determined in a number of consecutive batch reactions with re-use of the same TLIM, it was possible to estimate the enzyme deactivation rate as a function of oil volume that had been in contact with the enzyme. The solid fat content profile by p-NMR of the interesterified oils was used to calculate the enzyme performance in terms of average production rate Avg. Pro. (kg oil/kg enzyme/hr), volume-based half-life V½ (kg oil/kg enzyme) and initial reaction rate k-0 (1/min.). From these values it was possible to calculate the productivity that could be expected in use in full scale industrial plant (kg of interesterified oils produced by one kg of enzyme; kg oil/kg enzyme).

RDB palm oil was used as a reference in the MBA tests and results were compared with the same RDB palm oil with the addition of 50 ppm of soaps created in situ by the addition of 80 ppm of sodium hydroxide solution (2.5M) high shear mixed with the same RDB palm oil to produce a 50 ppm soaps/palm oil mix.

Tests were performed in double and conducted over a period of 14 days. The results are presented in Table 2. There is a clear difference between performance of the 50 ppm soaps/palm oil mix and RDB palm oil used as a reference.

TABLE 2

Comparison of performance of TLIM for a RDB palm oil and the same oil mixed with 50 ppm of soap.

|  | Average Productivity Range (Avg. Prod.) [kg/kg/hr] | volume-based half-life V½ [kg/kg] | Initial reaction rate k-0 [1/min] | Productivity [kg/kg] |
|---|---|---|---|---|
| Reference RDB Palm oil | 1.53-1.54 | 372-384 | 0.29-0.32 | 1116-1188 |
| Reference RDB Palm oil mixed with 50 ppm soap of sodium | 2.59-3.17 | 424-537 | 0.37-0.43 | 1272-1611 |

There is a substantial and unexpected improvement in the enzyme performance when the oil being interesterified contains 50 ppm of soaps. The improvement in productivity is about 50%. Such substantial performance improvements of the enzyme were not observed if the soaps were removed before the interesterification step. Rapid evaluation with other references oils gave lower enzyme performance, but these enzyme performances were also improved by about 50% when soaps were added to these other references oils.

Example 2

Enzyme Performance Evaluation for Continuous Packed Bed Reactors

This test was performed to verify if the presence of soap in the fatty material feed could lead to pressure built-up or even could lead to the plugging of the packed bed reactor and to determine the solid fat content of the interesterified fatty material produced over a very long production run.

A calculated amount of sodium hydroxide solution was mixed under high shear with RDB palm oil to produce a 50 ppm soaps/palm oil mix (in-situ production of soaps).

A lab-scale enzymatic continuous reactor was filled with pre-conditioned TLIM enzyme (*Thermomyces lanuginosus* lipase immobilized on silica granulates from Novozymes) and supplied with the 50 ppm soaps/palm oil mix from top to bottom. A manometer was installed between the feeding pump and the entrance of the column. The temperature of the reactor and of the oil was set at 70° C. and the flow-rate was adjusted to ensure full conversion of the oil at the outlet of the reactor. The continuous enzymatic reaction was performed during a period of 18 days without stopping. The pressure was inspected daily on the manometer. The enzymatically interesterified oil was sampled every day for quality control: soap, moisture, free fatty acid contents and the solid fat content (SFC) profile was determined by p-NMR according to IUPAC 2.150 serial method without tempering. During the period of the test, no pressure build-up over the column was observed. The outgoing oil was somewhat depleted in soap and other investigated quality parameters (moisture and free fatty acids contents) were considered satisfactory; the solid fat content profile of the interesterified oil remained sufficiently stable until the end of the period of test. Table 3 shows the SFC results obtained at 10, 15, 20, 30, 35 and 40° C. and demonstrate that satisfactory interesterification performance was obtained over a considerable period up time for a fatty material containing 50 ppm of soaps.

TABLE 3

Solid fat content (SFC (%@ ° C.) at different temperature versus time for the starting and the interesterified fatty materials.

| | Starting fatty material | Interesterified fatty material Time (hrs) | | | | |
|---|---|---|---|---|---|---|
| Temperature | 0.0 | 20.1 | 50.8 | 187.9 | 267.1 | 428.8 |
| | % SFC | | | | | |
| 10° C. | 50.0 | 58.7 | 58.4 | 57.9 | 57.4 | 57.1 |
| 15° C. | 41.0 | 49.1 | 48.5 | 47.5 | 48.3 | 46.5 |
| 20° C. | 28.1 | 39.1 | 38.7 | 37.5 | 38.4 | 36.2 |
| 30° C. | 10.1 | 18.7 | 18.4 | 17.7 | 18.0 | 16.4 |
| 35° C. | 5.3 | 11.2 | 11.3 | 11.5 | 11.4 | 10.3 |
| 40° C. | 1.4 | 7.2 | 7.7 | 7.4 | 7.2 | 6.5 |

The invention claimed is:

1. A fatty material enzyme interesterification process comprising the steps of:
   a) providing a fatty material that has optionally undergone at least one prior purification treatment;
   b) introducing soap into said fatty material to form a soap-containing fatty material mixture,
   c) homogenising said soap-containing fatty material mixture by mixing,
   d) contacting said soap-containing fatty material mixture with lipase to produce a soap-containing interesterified fatty material,
   e) removing soaps from said soap-containing interesterified fatty material to yield interesterified fatty material, wherein said soap is either formed in-situ by addition of aqueous alkali to said fatty material or said soap is introduced directly into said fatty material.

2. The process according to claim 1, wherein at least a part of said fatty material is a crude triglyceride oil that has been subjected to one or more prior purification treatments, said purification treatment comprising degumming, physical refining, chemical refining, neutralisation, bleaching, winterising or deodorisation.

3. The process according to claim 1, wherein the amount of soap contained in soap-containing fatty material is in the range of 5 to 200 ppm by weight of said fatty material.

4. The process according to claim 1, wherein said aqueous alkali is selected from the group consisting of sodium hydroxide, potassium hydroxide, calcium hydroxide, sodium sulphate, potassium sulphate, calcium sulphate, sodium phosphate, potassium phosphate, calcium phosphate, sodium citrate, potassium citrate, calcium citrate and mixtures thereof.

5. The process according to claim 4, wherein said aqueous alkali has a concentration between 1M and 10M.

6. The process according to claim 1, wherein said soap is selected from the group consisting of sodium stearate, potassium stearate, calcium stearate, magnesium stearate, sodium palmitate, potassium palmitate, calcium palmitate, magnesium palmitate, sodium oleate, potassium oleate, calcium oleate, magnesium oleate, sodium laurate, potassium laurate, calcium laurate, magnesium laurate and mixtures thereof.

7. The process according to claim 1, wherein the introduction of soap or the introduction of aqueous alkali in the fatty material of step (b) employs a dosing pump.

8. The process according to claim 1, wherein the homogenisation of soap in the fatty material of step (c) employs a high shear mixer.

9. The process according to claim 1, wherein interesterification step (d) is performed continuously by percolating said soap-containing fatty material through one or more packed bed reactors.

10. The process according to claim 9, wherein said soap-containing fatty material percolates top to bottom through one or more packed bed reactors.

11. The process according to claim 9, wherein said soap-containing fatty material percolates bottom to top through one or more packed bed reactors.

12. The process according to claim 1, wherein interesterification step (d) is performed at a temperature in the range of 30 to 90° C.

13. The process according to claim 1, wherein the soap removal of step e) includes a washing with an aqueous acid solution and/or a washing with an adsorbent material and a phase separation.

14. The process according to claim 1, wherein the lipase used in said step (d) is *Thermomyces lanuginosus* lipase.

15. The process according to claim 1, wherein one or more packed bed reactor of step (d) contain an adsorbent material.

16. The process according to claim 1, wherein said soap is in the form of an aqueous solution.

17. A process for improving the productivity of a fatty material enzyme interesterification process using soap, said process comprising the steps of:
   a) providing a fatty material that has optionally undergone at least one prior purification treatment;
   b) introducing soap into said fatty material to form a soap-containing fatty material mixture,
   c) homogenising said soap-containing fatty material mixture by mixing,
   d) contacting said soap-containing fatty material mixture with lipase to produce a soap-containing interesterified fatty material,
   e) removing soaps from said soap-containing interesterified fatty material to yield interesterified fatty material,
wherein said soap is either formed in-situ by addition of aqueous alkali to said fatty material or said soap is introduced directly into said fatty material.

* * * * *